(12) United States Patent
Hashimoto et al.

(10) Patent No.: US 11,686,640 B2
(45) Date of Patent: Jun. 27, 2023

(54) MASK ADHESION DETERMINATION DEVICE

(71) Applicant: YAMAMOTO KOGAKU CO., LTD., Higashiosaka (JP)

(72) Inventors: Hiroki Hashimoto, Higashiosaka (JP); Kenichi Sakamoto, Higashiosaka (JP)

(73) Assignee: YAMAMOTO KOGAKU CO., LTD., Higashiosaka (JP)

( * ) Notice: Subject to any disclaimer, the term of this patent is extended or adjusted under 35 U.S.C. 154(b) by 299 days.

(21) Appl. No.: 16/636,808

(22) PCT Filed: Aug. 27, 2018

(86) PCT No.: PCT/JP2018/031473
§ 371 (c)(1),
(2) Date: Feb. 5, 2020

(87) PCT Pub. No.: WO2019/044727
PCT Pub. Date: Mar. 7, 2019

(65) Prior Publication Data
US 2020/0370984 A1    Nov. 26, 2020

(30) Foreign Application Priority Data
Aug. 31, 2017  (JP) .............................. JP2017-166633

(51) Int. Cl.
*G01L 19/08* (2006.01)
*A41D 13/11* (2006.01)
*G01L 9/06* (2006.01)

(52) U.S. Cl.
CPC ............ *G01L 19/086* (2013.01); *A41D 13/11* (2013.01); *G01L 9/06* (2013.01)

(58) Field of Classification Search
CPC ......... G01L 9/06; G01L 19/086; A62B 18/00; A62B 18/02; A62B 18/006; A62B 27/00;
(Continued)

(56) References Cited

U.S. PATENT DOCUMENTS 8,789,526 B2 * 7/2014 Kwok .................... A61B 5/087
128/204.23
10,786,693 B1 * 9/2020 Opperman ........... A61B 5/0873
(Continued)

FOREIGN PATENT DOCUMENTS

CN         105699020 A       6/2016
JP         57-79739           5/1982
(Continued)

OTHER PUBLICATIONS

International Search Report issued in PCT/JP2018/031473 dated Oct. 16, 2018.
(Continued)

*Primary Examiner* — Thang X Le
(74) *Attorney, Agent, or Firm* — Heslin Rothenberg Farley & Mesiti P.C.

(57) ABSTRACT

A mask fitting level determination device includes a mask inner pressure detection unit inserted between a mask covering a mouth, nose and a face surface of a person to measure a pressure inside the mask. A circuit control unit derives information of a pressure value measured by the mask inner pressure detection unit and generates display information for the person wearing the mask. A determination display unit shows the person the display information generated by the circuit control unit. A battery unit supplies electricity to the circuit control unit and the determination display unit. A power supply switch starts and stops the supply of the electricity to the circuit control unit and the determination display unit. A start switch starts the mask inner pressure detection operation.

10 Claims, 5 Drawing Sheets

(58) Field of Classification Search
CPC .. A62B 9/006; G01M 3/3209; G01M 3/3218; G01M 3/3236; G01M 3/3263; G01M 3/3272; G01M 3/329; A61M 16/0003; A61M 16/0006; A61M 16/0009; A61M 16/0024; A61M 16/0027; A61M 16/201; A61M 16/0069

See application file for complete search history.

(56) References Cited

U.S. PATENT DOCUMENTS

| | | |
|---|---|---|
| 2005/0263155 A1 | 12/2005 | Gossweiler |
| 2006/0048783 A1 | 3/2006 | Liu et al. |
| 2012/0318266 A1 | 12/2012 | Chou |
| 2013/0263857 A1 | 10/2013 | Ahmad et al. |
| 2015/0133809 A1* | 5/2015 | Paul .................. A61M 16/0003 128/205.25 |
| 2016/0166859 A1 | 6/2016 | Rachapudi et al. |
| 2017/0303823 A1* | 10/2017 | Allsworth .............. A61B 10/00 |
| 2018/0008849 A1* | 1/2018 | Baker .................. G01M 3/3218 |
| 2018/0133429 A1* | 5/2018 | Reddy ............... A61M 16/0057 |
| 2018/0311517 A1* | 11/2018 | Patil ........................ A62B 18/02 |
| 2022/0040428 A1* | 2/2022 | Fogarty ............... A61M 16/024 |

FOREIGN PATENT DOCUMENTS

| | | |
|---|---|---|
| JP | 63502007 A | 8/1988 |
| JP | 2002210031 A | 7/2002 |
| JP | 2014085218 A | 5/2014 |
| WO | 2013151944 A1 | 10/2013 |

OTHER PUBLICATIONS

U.S. Appl. No. 16/599,713, filed Oct. 11, 2019, titled Mask Fitting Level Determination Device.

* cited by examiner

MASK ADHESION DETERMINATION DEVICE

CROSS REFERENCE TO RELATED APPLICATIONS

This application is related to U.S. patent application Ser. No. 16/599,713, filed on Oct. 11, 2019.

CROSS REFERENCE TO RELATED APPLICATIONS

This application is the National Phase filing under 35 U.S.C. § 371 of International Application No.: PCT/JP2018/031473, filed on Aug. 27, 2018, which claims priority to Japanese Application No.: 2017-166633, filed on Aug. 31, 2017. The contents of each of the prior applications are hereby incorporated by reference herein in their entirety.

BACKGROUND OF THE INVENTION

Field of the Invention

The present invention relates to a mask fitting level determination device capable of determining a fitting level when a mask is worn for breathing or the like that particularly requires a fittingness when the mask is worn for use as a dustproof mask, a gas mask, or a sanitary mask at a place where dust or poisonous gas is generated, such as in a plant or at a construction site.

Description of the Related Art

In the related art, an intra-facepiece (mask) environment measurement device capable of checking a degree of leakage of particles in real time and checking a relationship between the leakage of the particles and breathing of a wearing person is present as such a type of mask fitting level measurement device (Japanese Patent No. 5564728).

Such an intra-mask environment measurement device includes an intra-mask particle counter, an extra-mask particle counter, a pressure sensor that measures a pressure inside the mask, a particle number comparison calculating unit, and an output unit, measures the amount of particles using a particle counter of a laser light scattering scheme, and determines concentration of the number of particles.

However, the aforementioned intra-mask environment measurement device in the related art is a stationary device with a significantly complicated structure and has a problem that the device has a large shape and is significantly expensive.

Further, the aforementioned intra-mask environment measurement device in the related art uses a sampling tube to be inserted into the mask, which is likely to affect the fittingness of the mask. That is, it is necessary to insert two tubes for extracting the particles in the mask and the pressure in the mask, into the mask, and there is a problem that the tubes themselves may cause some problems in the fittingness.

The aforementioned intra-mask environment measurement device in the related art has problems that an operation method is not simple and that proficiency is required for accurate measurement.

The invention was thus made, and an object thereof is to provide a mask fitting level determination device with a significantly simple component configuration that can be driven by a battery, that can be reduced in size to a palm size, that can be readily used any time even in a small group level such as at a site in units of several persons, and that is inexpensive.

SUMMARY OF THE INVENTION

According to the present invention, there is provided a mask fitting level determination device including: a mask inner pressure detection unit 2 that is inserted between a mask 1 that covers a mouth and a nose and a face surface F of a wearing person and measures a pressure inside the mask 1; a circuit control unit 3 that derives determination information from a measurement result of a pressure value measured by the mask inner pressure detection unit 2 and generates display information for the wearing person; a determination display unit 4 that shows the wearing person the display information generated by the circuit control unit 3; a battery unit that supplies electricity to the circuit control unit 3 and the determination display unit 4; a power supply switch 6 that starts and stops the supply of the electricity to the circuit control unit 3 and the determination display unit 4; and a start switch 7 that starts a mask inner pressure detection operation.

In the mask fitting level determination device according to the invention, the mask inner pressure detection unit 2 is inserted between the mask 1 and the face surface F of the wearing person via a cable C.

In the mask fitting level determination device according to the invention, the mask inner pressure detection unit 2 has a wireless transmission function of transmitting the information of the measured pressure value to the circuit control unit 3, and the circuit control unit 3 has a wireless reception function of receiving the information of the pressure value sent from the mask inner pressure detection unit 2.

In the mask fitting level determination device according to the invention, the mask inner pressure detection unit 2 is an ultra-small pressure sensor of a piezoresistive type.

In the mask fitting level determination device according to the invention, the determination display unit 4 includes good fitting display units G and a bad fitting display unit B, and the good fitting display units G are turned on when a difference in variation Da in a mask inner pressure in a trial time a required for mask fitting level determination is equal to or greater than prescribed threshold values Dp, and the bad fitting display unit B is turned on when the difference in variation Da is less than the prescribed threshold values Dp.

In the mask fitting level determination device according to the invention, the plurality of good fitting display units G are provided on the basis of the plurality of prescribed threshold values Dp set in a stepwise manner in accordance with fitting levels, and the plurality of good fitting display units are turned on in accordance with a stage of the prescribed threshold values Dp.

In the mask fitting level determination device according to the invention, a mirror 11 for checking how the mask 1 is worn is provided at an opening/closing lid 9 of a main body 8, and an accommodation unit 10 for the mask inner pressure detection unit 2 and a cable C is provided at the main body 8.

In the mask fitting level determination device according to the invention, a clamp that can pinch an edge of the mask 1 is provided at the mask inner pressure detection unit 2.

Since the mask fitting level determination device according to the invention is configured as described above, the mask fitting level determination device has a significantly simple component configuration, can be driven by a battery, can be reduced in size to a palm size, can be readily used any time even in a small group level such as at a site in units of several persons, and is inexpensive.

DETAILED DESCRIPTION OF THE PREFERRED EMBODIMENT

Figure 1:
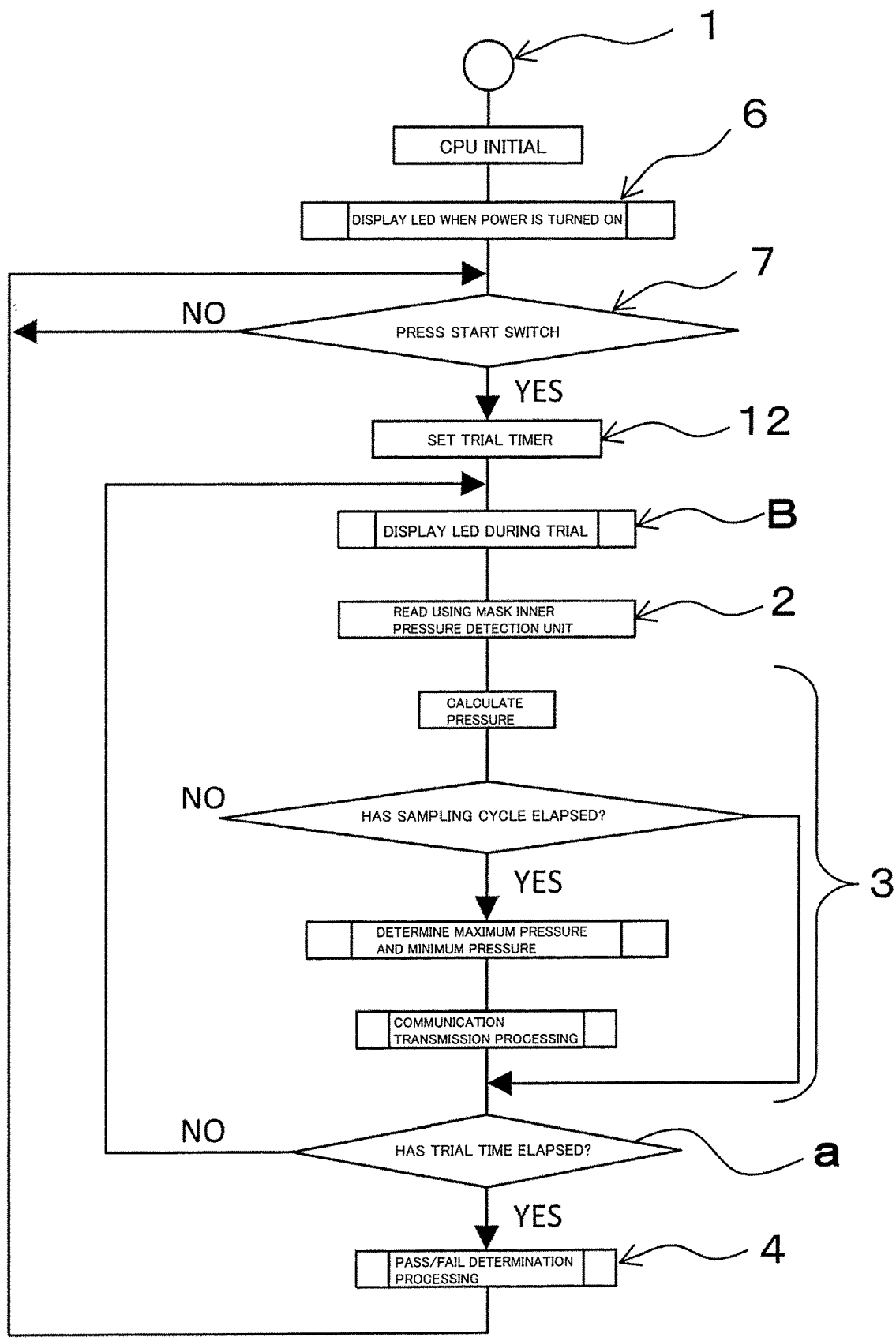
FIG. 1 is a schematic view illustrating an embodiment of a mask fitting level determination device according to the invention.

Hereinafter, an embodiment for implementing a mask fitting level determination device according to the invention will be described in detail with reference to drawings.

As illustrated in FIGS. 1 to 4, a mask fitting level determination device according to the invention includes: a mask inner pressure detection unit 2 that is inserted between a mask 1 that covers a mouth and a nose and a face surface F of a wearing person and measures a pressure inside the mask 1; a circuit control unit 3 that derives determination information from a measurement result of a pressure value measured by the mask inner pressure detection unit 2 and generates display information for the wearing person; a determination display unit 4 that shows the wearing person the display information generated by the circuit control unit 3; a battery unit (not illustrated) that supplies electricity to the circuit control unit 3 and the determination display unit 4; a power supply switch 6 that starts and stops the supply of the electricity to the circuit control unit 3 and the determination display unit 4; and a start switch 7 that starts a mask inner pressure detection operation.

Further, the mask fitting level determination device according to the invention includes an opening/closing lid 9 provided at a main body 8, and as needed, the mask inner pressure detection unit 2 and an accommodation unit 10 for a cable C, which will be described later, are provided at the main body 8, and a mirror 11 for checking a wearing state of the mask 1 is provided inside the opening/closing lid 9. Since the mask inner pressure detection unit 2 is a precision electronic device, the mask inner pressure detection unit 2 is preferably accommodated in the accommodation unit 10 in order to prevent breakage and loss. The mirror 11 is preferably provided in order to actually view the wearing state of the mask 1.

The mask inner pressure detection unit 2 is inserted between the mask 1 and the face surface F of the wearing person via the cable C. The mask inner pressure detection unit 2 is provided with a pinchable clamp at an edge of the mask 1 although not illustrated in the drawing. The clamp is for preventing the mask inner pressure detection unit 2 from unexpectedly moving inside the mask 1, allows for accurate measurement of the mask inner pressure, and prevents the wearing person from having an unpleasant feeling.

The mask inner pressure detection unit 2 is an ultra-small pressure sensor with a size in a level of several mm of a piezoresistive type and is preferably water-proofing. The mask inner pressure detection unit 2 does not become an obstacle inside the mask 1 by employing such an ultra-small pressure sensor and can be used even if a highly humid environment is achieved in the mask 1 by employing water-proofing.

Further, the mask inner pressure detection unit 2 is provided with a wireless transmission function for transmitting information regarding the measured pressure value to the circuit control unit 3, and the circuit control unit 3 can be provided with a wireless receiving function for receiving the information regarding the pressure value transmitted from the mask inner pressure detection unit 2. The necessity of the cable C is eliminated by wirelessly connecting the mask inner pressure detection unit 2 to the circuit control unit 3 in this manner, and the mask inner pressure detection unit 2 is more easily inserted between the mask 1 and the face surface F of the wearing person.

The circuit control unit 3 includes an internal information device such as a microcomputer attached thereto and is provide with a terminal (not illustrated) that can be connected to an external information device such as a personal computer or a smartphone such that programs of the microcomputer can be corrected and accumulated measurement history data and the like are retrieved, and electric power is supplied thereto from a battery unit (not illustrated) such as a battery incorporated in the main body 8.

Figure 2:
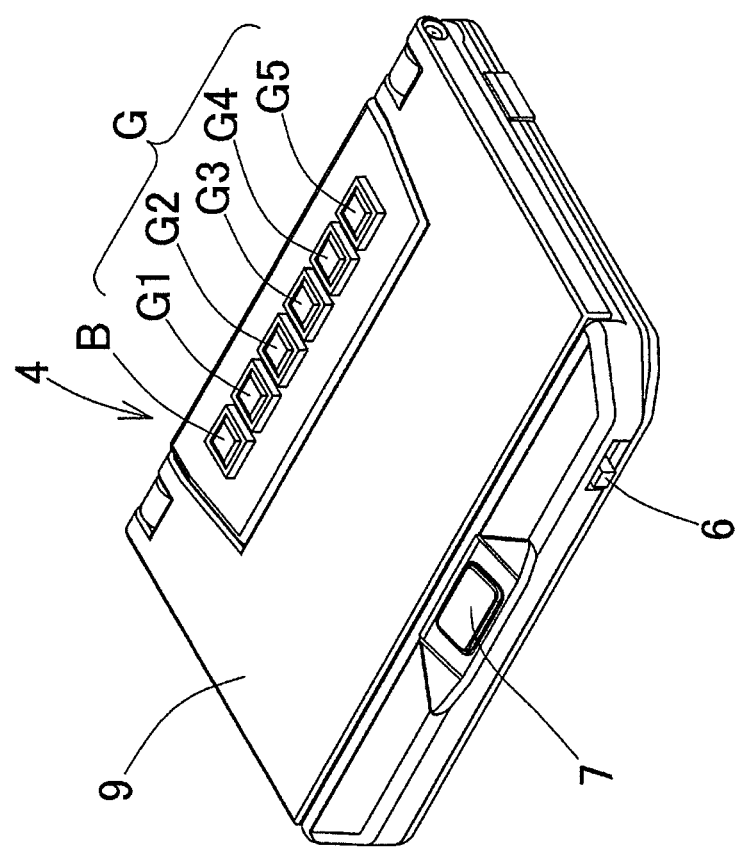
FIG. 2 is a perspective view illustrating an appearance of a mask fitting level determination device illustrated in FIG. 1.
Figure 3:
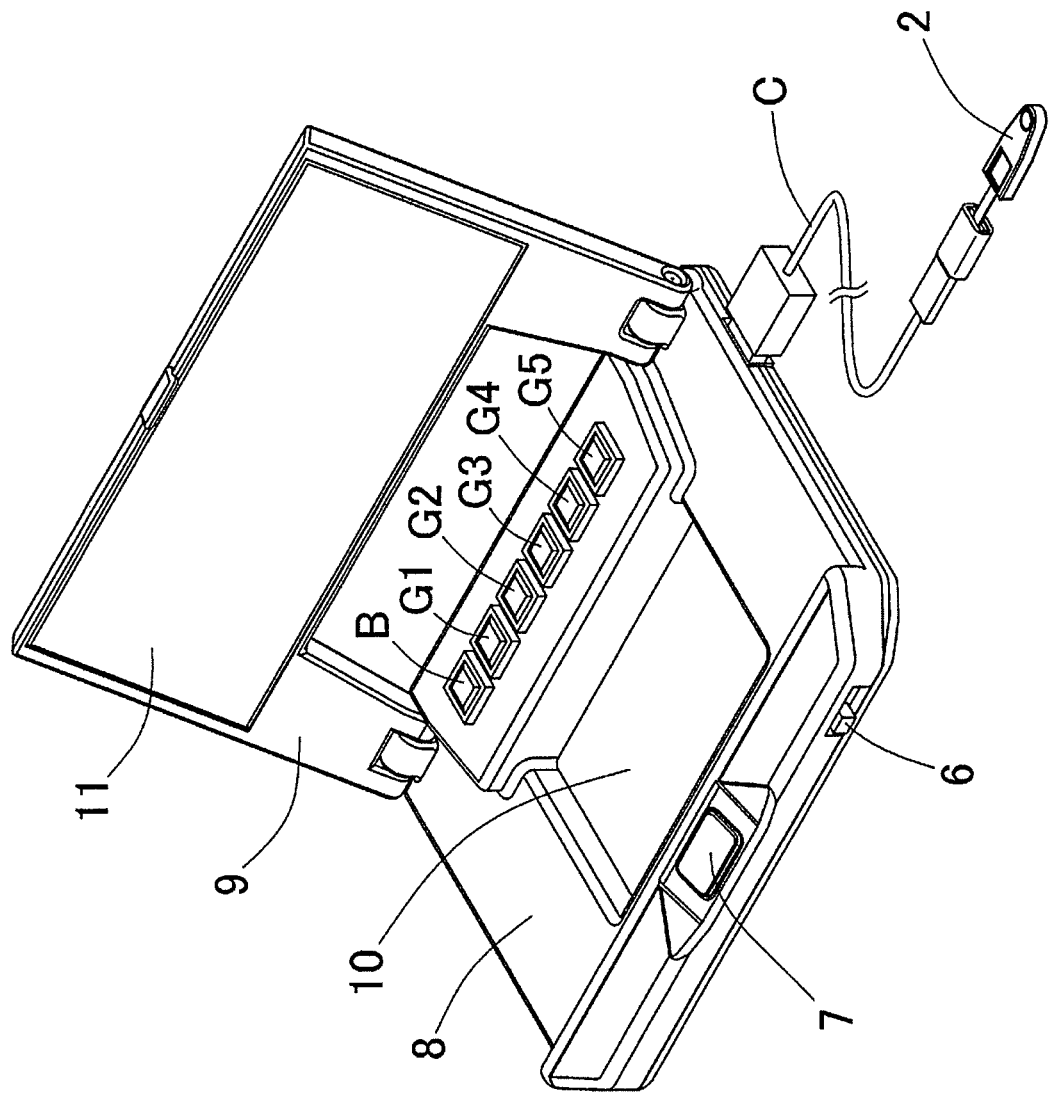
FIG. 3 is a perspective view illustrating a state in which an opening/closing lid of the mask fitting level determination device according to the invention illustrated in FIG. 1 is opened.
Figure 4:
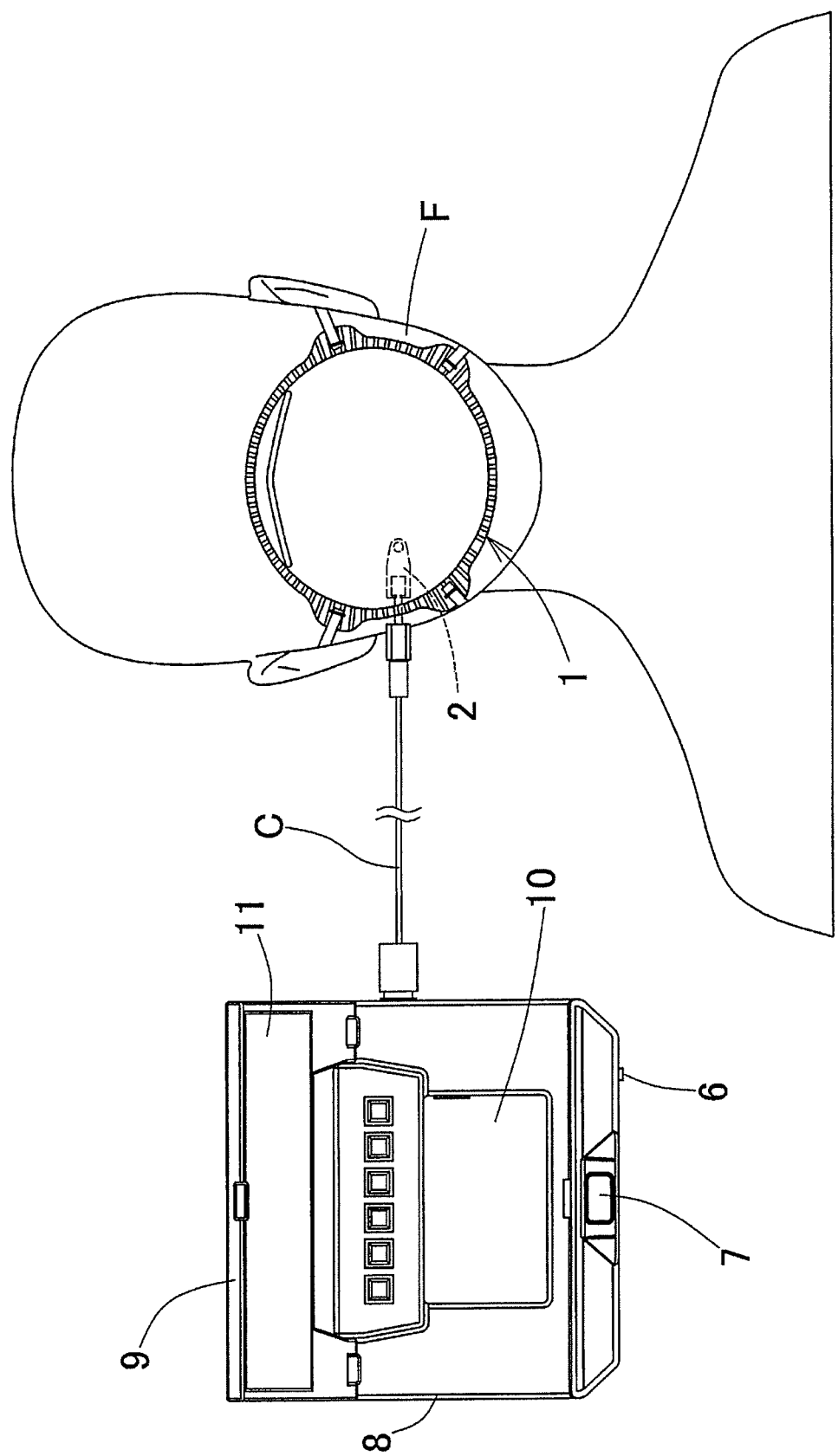
FIG. 4 is an explanatory diagram illustrating a state in which the mask fitting level determination device according to the invention is used.

The determination display unit 4 includes good fitting display units G and a bad fitting display unit B, the good fitting display units G are turned on when a difference in variation Da of a mask inner pressure in a trial time a required for mask fitting level determination is equal to or greater than prescribed threshold values Dp, and the bad fitting display unit B is turned on when the difference in variation Da is less than the prescribed threshold values Dp. In addition, the plurality of good fitting display units G, such as G1 to G5 as illustrated in FIGS. 2 and 3, for example, are provided on the basis of the plurality of prescribed threshold values Dp set in a stepwise manner in accordance with fitting levels, and further, the good fitting display units G1 to G5 are turned on in accordance with a stage of the prescribed threshold values Dp.

Figure 5:
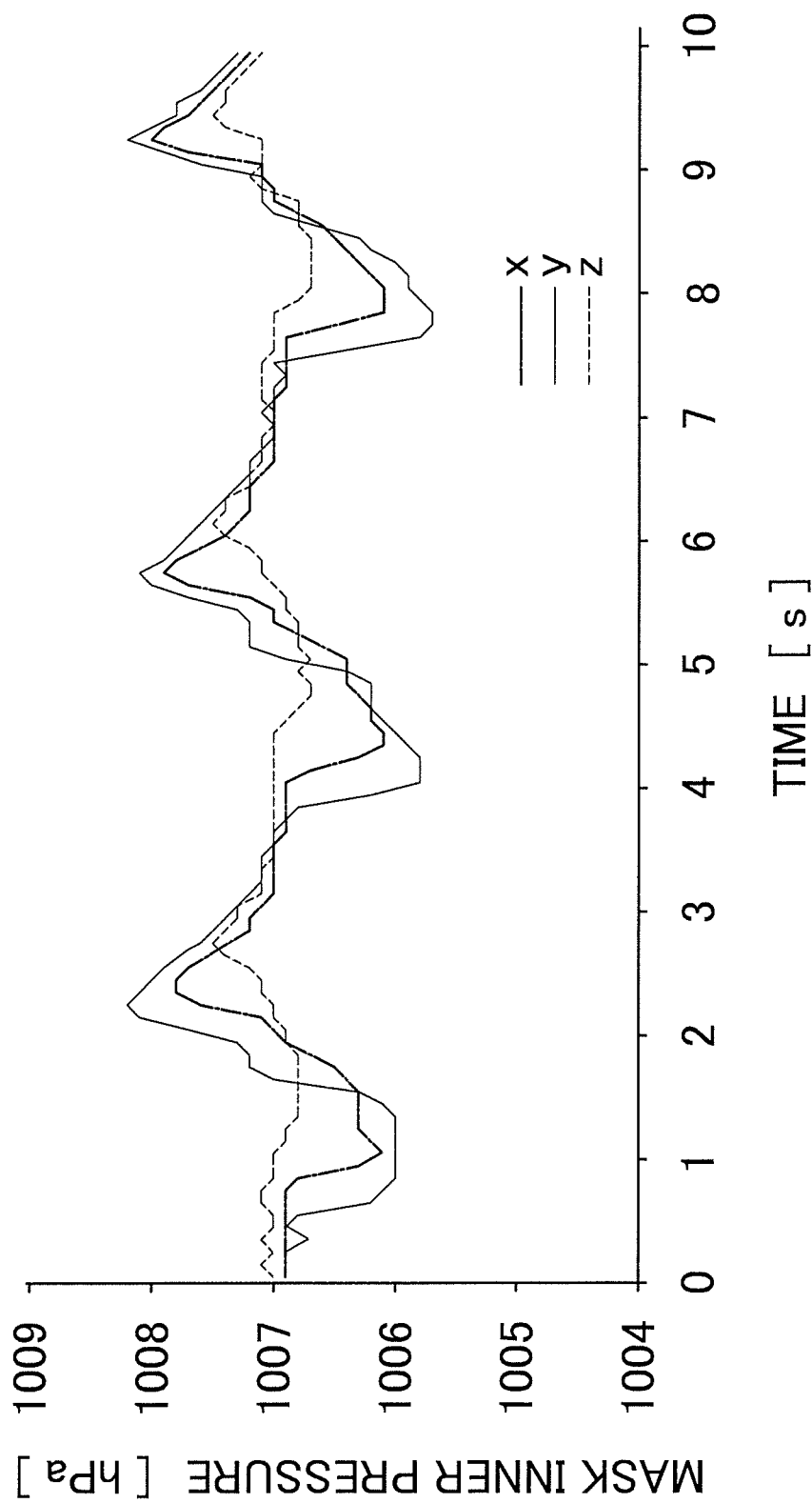
FIG. 5 is a graph illustrating changes in mask inner pressure in each conditions of the mask fitting level determination device according to the invention.

Specifically, when the mask inner pressure detection unit 2 and the circuit control unit 3 were connected with the cable C, the difference in variation Da of the mask inner pressure=1.7 hPa (a difference between 1006.1 hPa and 1007.8 hPa) in the trial time a=0 to 2.4 seconds (for 2.4 seconds), the difference in variation Da of the mask inner pressure=1.7 hPa (a difference between 1007.8 hPa and 1006.1 hPa) in the trial time a=2.4 to 4.4 seconds (for 2.0 seconds), the difference in variation Da of the mask inner pressure=1.8 hPa (a difference between 1006.1 hPa and 1007.9 hPa) in the trial time a=4.4 to 5.8 seconds (for 1.4 seconds), the difference in variation Da of the mask inner pressure=1.8 hPa (a difference between 1007.9 hPa and 1006.1 hPa) in the trial time a=5.8 to 7.8 seconds (for 2.0 seconds), and the difference in variation Da of the mask inner pressure=1.9 hPa (a difference between 1006.1 hPa and 1008.0 hPa) in the trial time a=7.8 to 9.3 seconds (for 1.5 seconds) were respectively measured as illustrated by the polygonal line x in FIG. 5.

Therefore, it is possible to turn on the good fitting display units G when the difference in variation Da is equal to or greater than a prescribed threshold value DP=0.9 hPa (a substantially intermediate value of the differences in variation Da) and to turn on the bad fitting display unit B when the difference in variation Da is less than the prescribed threshold value Dp=0.9 hPa, for example, in this case.

Further, in order to set the plurality of prescribed threshold values Dp in a stepwise manner in this case, it is possible to turn on the good fitting display unit G5 when the difference in variation Da is equal to or greater than the prescribed threshold value Dp=0.7 hPa, to turn on the good fitting display unit G4 when the difference in variation Da is equal to or greater than the prescribed threshold value Dp=1.5 hPa, to turn on the good fitting display unit G3 when the difference in variation Da is equal to or greater than the prescribed threshold value Dp=1.3 hPa, to turn on the good fitting display unit G2 when the difference in variation Da is equal to or greater than the prescribed threshold value Dp=1.1 hPa, to turn on the good fitting display unit G1 when the difference in variation Da is equal to or greater than the prescribed threshold value Dp=0.9 hPa, and to turn on the bad fitting display unit B when the difference in variation Da is less than 0.9 hPa, for example.

Also, in a case in which the mask inner pressure detection unit 2 and the circuit control unit 3 were connected in a wireless manner, the difference in variation Da of the mask inner pressure=2.2 hPa (a difference between 1006.0 hPa and 1008.2 hPa) in the trial time a=0 to 2.2 seconds (for 2.2 seconds), the difference in variation Da of the mask inner pressure=2.4 hPa (a difference between 1008.2 hPa and 1005.8 hPa) in the trial time a=2.2 to 4.1 seconds (for 1.9 seconds), the difference in variation Da of the mask inner pressure=2.2 hPa (a difference between 1005.8 hPa and 1008.0 hPa) in the trial time a=4.1 to 5.8 seconds (for 1.7 seconds), the difference in variation Da of the mask inner pressure=2.3 hPa (a difference between 1008.0 hPa and 1005.7 hPa) in the trial time a=5.8 to 7.8 seconds (for 2.0 seconds), and the difference in variation Da of the mask inner pressure=2.4 hPa (a difference between 1005.7 hPa and 1008.1 hPa) in the trial time a=7.8 to 9.3 seconds (for 1.5 seconds) were respectively measured as illustrated by the polygonal line y in FIG. 5.

Therefore, it is possible to turn on the good fitting display units G when the difference in variation Da is equal to or greater than the prescribed threshold value Dp=1.2 hPa (a substantially intermediate value of the differences in variation Da) and to turn on the bad fitting display unit B when the difference in variation Da is less than the prescribed threshold value Dp=1.2 hPa, for example, in this case.

Further, in order to set the plurality of prescribed threshold values Dp in a stepwise manner in this case, it is possible to turn on the good fitting display unit G5 when the difference in variation Da is equal to or greater than the prescribed threshold value Dp=2.4 hPa, to turn on the good fitting display unit G4 when the difference in variation Da is equal to or greater than the prescribed threshold value Dp=2.1 hPa, to turn on the good fitting display unit G3 when the difference in variation Da is equal to or greater than the prescribed threshold value Dp=1.8 hPa, to turn on the good fitting display unit G2 when the difference in variation Da is equal to or greater than the prescribed threshold value Dp=1.5 hPa, to turn on the good fitting display unit G1 when the difference in variation Da is equal to or greater than the prescribed threshold value Dp=1.2 hPa, and to turn on the bad fitting display unit B when the difference in variation Da is less than the prescribed threshold value Dp=1.2 hPa.

Note that in a case in which two tubes for taking particles in a mask and a pressure inside the mask were inserted into the mask as in a mask internal environment measurement device in the related art, the difference in variation Da of the mask inner pressure=0.7 hPa (a difference between 1006.8 hPa and 1007.5 hPa) in the trial time a=0 to 2.7 seconds (for 2.7 seconds), the difference in variation Da of the mask inner pressure=0.8 hPa (a difference between 1007.5 hPa and 1006.7 hPa) in the trial time a=2.7 to 4.7 seconds (for 2.0 seconds), the difference in variation Da of the mask inner pressure=0.8 hPa (a difference between 1006.7 hPa and 1007.5 hPa) in the trial time a=4.7 to 6.2 seconds (for 1.5 seconds), the difference in variation Da of the mask inner pressure=0.8 hPa (a difference between 1007.5 hPa and 1006.7 hPa) in the trial time a=6.2 to 8.0 (for 1.8 seconds seconds), and the difference in variation Da of the mask inner pressure=0.8 hPa (a difference between 1006.7 hPa and 1007.5 hPa) in the trial time a=8.0 to 9.4 seconds (for 1.4 seconds) were respectively measured as illustrated by the polygonal line z in FIG. 5.

Therefore, although it is possible to turn on the good fitting display units G when the difference in variation Da is equal to or greater than the prescribed threshold value Dp=0.4 hPa (a substantially intermediate value of the differences in variation Da) and to turn on the bad fitting display unit B when the difference in variation Da is less than the prescribed threshold value Dp=0.4 hPa, for example, it is difficult to set the plurality of prescribed threshold values Dp in a stepwise manner since the differences in variation Da of the mask inner pressure range from 0.7 to 0.8 hPa and no differences can be made in numerical values in this case.

Thus, the mask fitting level of the mask wearing person is determined using the mask fitting level determination device according to the invention as follows.

First, the opening/closing lid 9 is opened as illustrated in FIG. 3 from the state illustrated in FIG. 2, and the mask inner pressure detection unit 2 and the cable C are taken out of the accommodation unit 10 of the main body 8.

Next, in a state in which the cable C taken out is connected to the main body 8, the mask 1 is attached to the face surface F, and the wearing person checks and adjusts how the mask 1 is attached while viewing the mirror 11 (note that it is not necessary to connect the cable C to the main body 8 in a case in which the mask inner pressure detection unit 2 and the circuit control unit 3 are wirelessly connected). Then, the mask inner pressure detection unit 2 is inserted between the mask 1 and the face surface F, and the mask inner pressure detection unit 2 is pinched with a clamp at the edge of the mask 1.

If an operation of turning on the power supply switch 6 is performed, and the start switch 7 is pressed in this state, then a trial timer 12 is set, the mask inner pressure detection operation is started, and after elapse of the trial time a, the good fitting display units G or the bad fitting display unit B is turned on. Note that the bad fitting display unit B is turned on before the trial time a elapses. It is determined that the mask fitting level is good if the good fitting display units G are turned on, and it is determined that the mask fitting level is bad if the bad fitting display unit B is turned on. When it is determined that the mask fitting level is bad, how the mask 1 is worn is checked and fixed, and a similar determination operation is repeated again until the good fitting display units G are turned on.

Note that when the plurality of good fitting display units G, such as G1 to G5, are provided, the good fitting display units G1 to G5 are turned on in a stepwise manner in accordance with the fitting level. When the good fitting display units G are turned on only up to G1 and G2, for example, the mask fitting level is not good, and how the mask 1 is worn is thus to be checked and fixed. Then, the good fitting display units G are turned on in the order of G3, G4, and G5. Then, it is determined that the mask fitting level is good if the good fitting display units G are turned on up to G4 or G5, and it is determined that the mask fitting level is between good and bad if the good fitting display units G are turned on up to G3. Therefore, it is preferable to check and fix how the mask 1 is worn and to repeat a redetermination operation in this case as well. Note that it is a matter of course that the good fitting display units G are not limited to the five stages G1 to G5 and it is also possible to arbitrarily set determination in the respective stages.

The mask fitting level determination device according to the invention configured as described above has a significantly simple component configuration, can be driven by a battery, can be reduced in size to a palm size, can be readily used any time even in a small group level such as at a site in units of several persons, and is inexpensive.

REFERENCE SIGNS LIST

1 Mask
2 Mask inner pressure detection unit
3 Circuit control unit
4 Determination display unit
6 Power supply switch
7 Start switch
8 Main body
9 Opening/closing lid
10 Accommodation unit
11 Mirror
B Bad fitting display unit
C Cable
Da Difference in variation
Dp Prescribed threshold value
F Face surface
G Good fitting display unit

What is claimed is:

1. A method for using a mask fitting level determination device, comprising:
    inserting a mask inner pressure detection unit between a mask that covers a mouth and a nose and a face surface of a wearing person;
    measuring pressure value inside the mask with the mask inner pressure detection unit;
    using a circuit control unit to derive determination information from a measurement result of the pressure value;
    generating display information for the wearing person based on the circuit control unit;
    showing the wearing person the display information on a determination display unit;
    activating a start switch to start a mask inner pressure detection operation; and
    showing at least one of good fitting display units and bad fitting display units on the display information on the determination display unit shows;
    wherein the good fitting display units being activated when a difference in variation of a mask inner pressure in a trial time required for mask fitting level determination is equal to or greater than prescribed threshold values, and the bad fitting display unit is activated when the difference in variation is less than the prescribed threshold values;
    providing a plurality of good fitting display units on the basis of the plurality of prescribed threshold values set in a stepwise manner in accordance with fitting levels; and
    turning on the plurality of good fitting display units in accordance with a stage of the prescribed threshold values.

2. The method of claim 1, further comprising:
    supplying electricity to the circuit control unit and the determination display unit by a battery unit.

3. The method of claim 1, further comprising:
    using a power supply switch to start and stop the supply of electricity to the circuit control unit and the determination display unit.

4. The method of claim 1, wherein the mask inner pressure detection unit is inserted between the mask and the face surface of the wearing person using a cable.

5. The method of claim 1, further comprising:
    using a wireless transmission function of the mask inner pressure detection unit to transmit the information of the measured pressure value to the circuit control unit.

6. The method of claim 1, further comprising:
    using a wireless receiving function of the circuit control unit to receive the information of the pressure value sent from the mask inner pressure detection unit.

7. The method of claim 1, wherein the mask inner pressure detection unit is an ultra-small pressure sensor of a piezoresistive type.

8. The method of claim 1, further comprising:
    providing a mirror for checking how the mask is worn at an opening/closing lid of a main body.

9. The method of claim 1, further comprising:
    providing an accommodation unit for the mask inner pressure detection unit and a cable at a main body.

10. The method of claim 1, further comprising:
    pinching an edge of the mask and the mask inner pressure detection unit with a clamp.

* * * * *